United States Patent [19]

Brewer et al.

[11] Patent Number: 5,704,208
[45] Date of Patent: Jan. 6, 1998

[54] SERVICEABLE LINER FOR GAS TURBINE ENGINE

[76] Inventors: Keith S. Brewer, 432 Ebbtide Dr.; Raymond J. Bruchez, Jr., P.O. Box 14504, both of North Palm Beach, Fla. 33408

[21] Appl. No.: 567,644

[22] Filed: Dec. 5, 1995

[51] Int. Cl.⁶ .................................... F02K 1/82
[52] U.S. Cl. .................. 60/261; 60/39.31; 60/752
[58] Field of Search .................. 60/39.31, 39.32, 60/261, 265, 266, 752, 753, 754

[56] References Cited

U.S. PATENT DOCUMENTS

| | | | |
|---|---|---|---|
| 2,938,333 | 5/1960 | Wetzler | 60/261 |
| 3,866,417 | 2/1975 | Velegol | 60/39.32 |
| 4,071,194 | 1/1978 | Eckert et al. | 239/127.3 |
| 4,422,300 | 12/1983 | Dierberger et al. | 60/757 |
| 4,944,151 | 7/1990 | Vovnanian | 60/39.32 |
| 4,989,407 | 2/1991 | Grant, Jr. | 60/261 |
| 5,099,644 | 3/1992 | Sabla et al. | 60/267 |
| 5,142,858 | 9/1992 | Ciokajlo et al. | 60/39.33 |
| 5,144,793 | 9/1992 | Able et al. | 60/39.32 |
| 5,209,059 | 5/1993 | Ward | 60/261 |
| 5,307,624 | 5/1994 | Even-Nur et al. | 60/226.3 |
| 5,333,443 | 8/1994 | Halila | 60/39.31 |
| 5,363,643 | 11/1994 | Halila | 60/39.31 |
| 5,385,015 | 1/1995 | Clements et al. | 60/261 |

FOREIGN PATENT DOCUMENTS

| | | | |
|---|---|---|---|
| 54-40909 | 9/1977 | Japan | 60/39.32 |

*Primary Examiner*—Louis J. Casaregola
*Attorney, Agent, or Firm*—Richard D. Getz

[57] ABSTRACT

A serviceable liner is provided comprising an outer wall, an inner wall, a plurality of standoffs disposed between the walls, and a plurality of attachment assemblies for attaching the walls to one another. The outer wall includes a plurality of first apertures. The inner wall includes a plurality of sections, each section having at least one second aperture. Each attachment assembly includes a fastener and an insert. An insert is received within each first aperture and a fastener is received within each insert.

17 Claims, 2 Drawing Sheets

SERVICEABLE LINER FOR GAS TURBINE ENGINE

BACKGROUND OF THE INVENTION

1. Technical Field

This invention pertains to gas turbine engines in general, and in particular to liners within gas turbine engines.

2. Background Information

Liners are often employed in gas turbine engines to enclose high temperature core gas paths. An augmentor, for example, may use a cylindrical or similarly shaped liner to direct core gas flow between the turbine exhaust and the nozzle. Liners generally include an outer wall (also called a "duct wall"), an inner wall (also called a "liner wall") and a means for spacing the two walls a distance apart. The duct created between the two walls is used as a cooling air passage. In conventional gas turbine engines, corrugations extending between the two walls space the two walls a distance apart. Fasteners attach the corrugations and the walls together and collectively form a rigid cylindrical structure. In most cases, access to the outside of the outer wall is necessary to attach the fasteners.

A significant pressure difference across the liner is necessary to force the cooling air through the liner. As a result, the liner experiences loadings similar to that of a pressure vessel. During operation of the engine, for example, the difference in pressure between the cooling gas within the duct and the core gas radially inside of the wall is such that the inner wall is forced inward around the entire circumference of the liner. If the inward force is too great for the inner wall, the wall can buckle and necessitate replacement. To avoid undesirable buckling, it is known to increase wall thicknesses within the liner, or add structural supports. Increasing the robustness of the walls and/or adding structural members can solve structural problems, but generally does so at the cost of adding undesirable weight.

High core gas temperatures can also limit the useful life of the augmentor liner. Cooling schemes and coatings can be used to decrease the rate of thermal damage, but eventually the inner liner must be removed and replaced.

At present, it is often necessary to remove the entire engine, or a substantial section of it, during augmentor liner service. Once the engine or engine section is out of the aircraft, the fasteners holding the liner together can be accessed and the damaged liner replaced if necessary. Removing the engine is a timely and costly endeavor, however. A liner that does not require engine or engine section removal during liner service would be advantageous.

DISCLOSURE OF THE INVENTION

It is, therefore, an object of the present invention to provide a liner that may be readily serviced.

It is another object of the present invention to provide a liner that enhances the maintenance of coatings applied thereto.

It is still another object of the present invention to provide a liner that minimizes the cost of maintenance.

According to the present invention, a liner is provided comprising an outer wall, an inner wall, a plurality of standoffs disposed between the walls, and a plurality of attachment assemblies for attaching the walls to one another. The outer wall includes a plurality of first apertures. The inner wall includes a plurality of sections, each section having at least one second aperture. Each attachment assembly includes a fastener and an insert. An insert is received within each first aperture and a fastener is received within each insert.

According to one aspect of the present invention, each insert includes means for locking the fastener within the insert and locking the insert within the outer wall.

According to another aspect of the present invention, the inner wall sections include male and female joints along circumferential edges for joining one another.

The present invention permits the removal and replacement of individual inner wall sections rather than entire circumferential liner sections. This feature provides several significant advantages over liners presently available. If a portion of an augmentor liner is damaged, for example, the entire circumferential liner must be removed before it can be repaired or replaced. If the engine or engine sections must be removed before the liner can be removed, the labor cost is substantial. The same repair using the present invention liner, on the other hand, is accomplished at a fraction of the cost because only the damaged inner wall sections need be removed and replaced. In addition, the material replacement cost of a circumferential liner is daunting relative to the cost of one or more inner wall sections. A still further advantage of the present invention is the time required to replace inner wall sections is considerably less than that required to repair conventional liners. Augmented aircraft are generally used for military purposes, where it is a distinct disadvantage to have an aircraft off-line. The present invention minimizes the time required to maintain augmentor liners and thereby minimizes aircraft downtime.

A still further advantage of the present invention is that the inner wall sections are logistically easier to stock and provide than a full circumferential augmentor liner. This provides a distinct maintenance advantage.

A still further advantage of the present invention is that a liner is provided to which a coating may be more readily adhered. The inner wall sections are less apt to significantly warp due to thermal load because they may expand more readily. Reducing the warpage helps minimize bonding over stress between the coating and the inner wall. Over stress frequently results in coating separation from the inner wall.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 2 is a sectional view of the liner embodiment shown in FIG. 1.

BEST MODE FOR CARRYING OUT THE INVENTION

Figure 1:
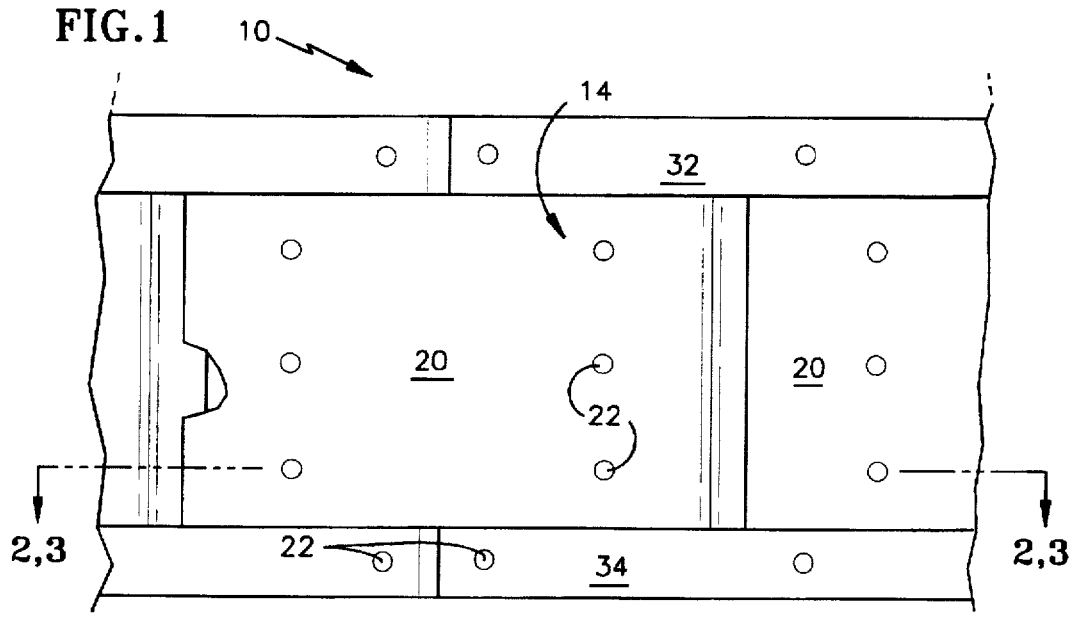
FIG. 1 is a diagrammatic view of the present invention liner.
Figure 2:
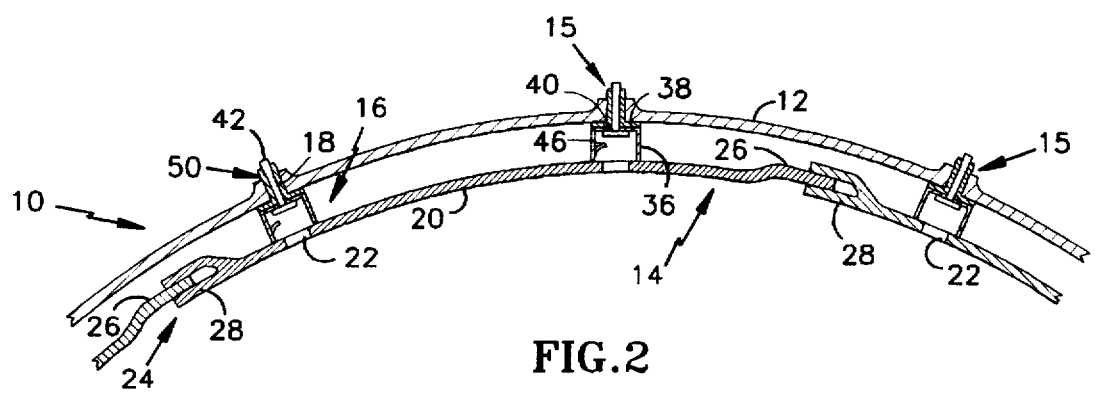
FIGS. 2 and 3 are cross-sectional diagrammatic views of the present invention liner.
Figure 3:
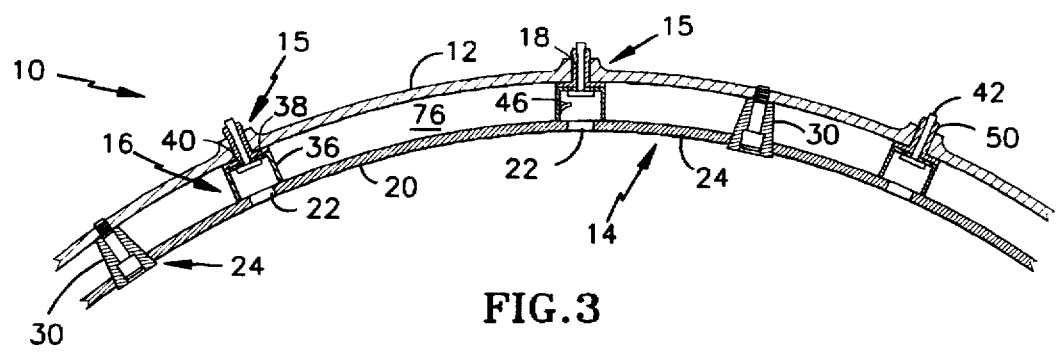

Referring to FIGS. 1-3, a liner 10 for a gas turbine augmentor is shown. The liner 10 includes an outer wall 12, an inner wall 14, a plurality of standoffs 16 (FIGS. 2 and 3), and a plurality of attachment assemblies 15. The outer wall 12 is cylindrically shaped and includes a plurality of first apertures 18. The inner wall 14 is formed from a plurality of sections 20, each section 20 having at least one second aperture 22. The inner wall sections 20 may assume a variety of shapes including the rectangular shape shown in FIG. 1. In a first embodiment shown in FIG. 2, the circumferential ends 24 of each section include mating male 26 and female 28 joint halves. In a second embodiment shown in FIG. 3, the circumferential ends 24 of the sections 20 are in contact with tapered ribs 30 attached to the outer wall 12. Referring to FIG. 1, in some applications the inner wall 14 may also include leading edge 32 and trailing edge 34 panels. The panels 32, 34 are disposed on each axial end of the inner wall liner sections 20 to provide a desirable transition between the upstream and downstream engine components (not shown).

Referring to FIGS. 2 and 3, each standoff 16 includes one or more sidewalls 36 and a base 38. The base 38 includes an aperture or a slot 40 (see also FIG. 8) for receiving a fastener 42. The height of the sidewalls 36 establishes the distance the inner wall sections 20 and the outer wall 12 are separated. The standoffs 16 are positioned between the inner 14 and outer walls 12 in alignment with the second 22 and first 18 apertures, respectively. A tab 46 may be included in one or more sidewalls 36 that extends out toward the aperture or slot 40.

Figure 4:
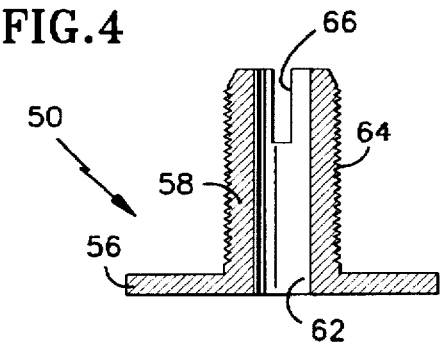
FIG. 4 is a cross-sectional diagrammatic view of the insert.
Figure 8:
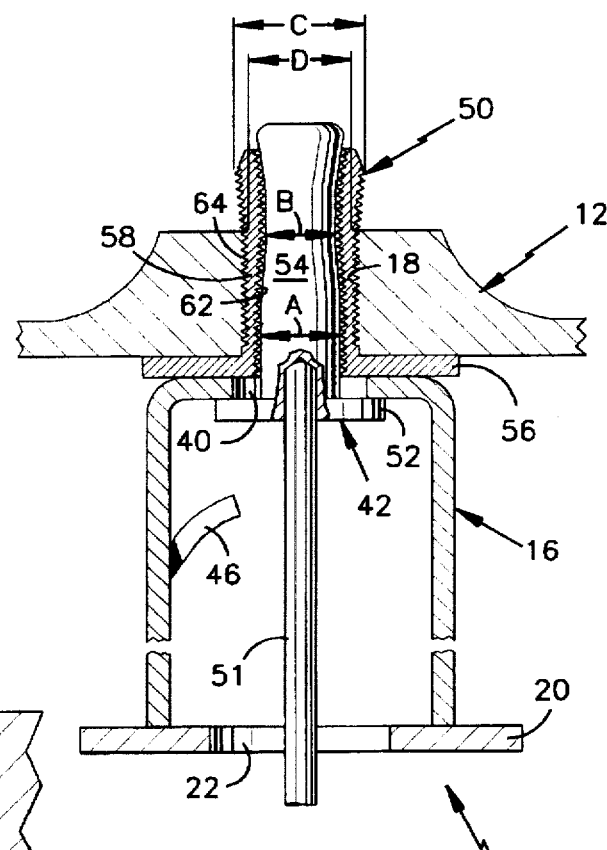
FIG. 8 shows an enlarged view of one of the attachment assemblies shown in FIGS. 2 and 3.
Figure 5:
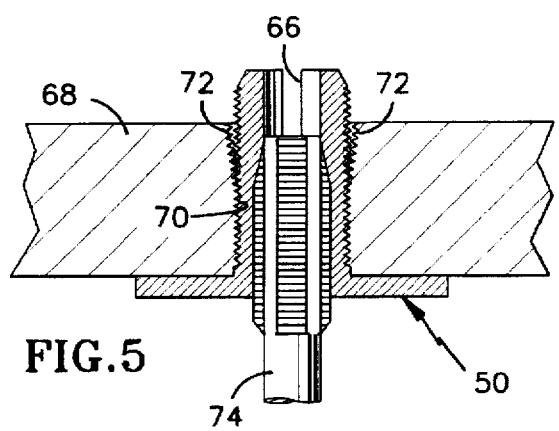
FIGS. 5 and 6 show the insert received within a tooling fixture.
Figure 6:
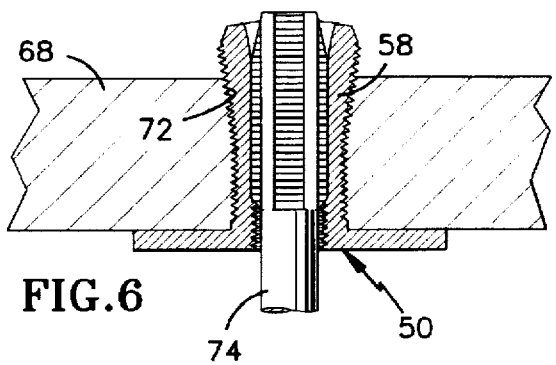

Referring to FIG. 8, each attachment assembly 15 includes a fastener 42 and an insert 50. The fastener 42 includes a head 52 and a shaft 54. The insert 50 includes a flange 56 and a body 58. The insert flange 56 is shaped to accept a tool (not shown) for torquing purposes. The insert body 58 includes a center bore 62, an outer surface 64, and one or more slots 66 (see FIG. 4) disposed within the end of the body 58 opposite the flange 56.

Figure 7:
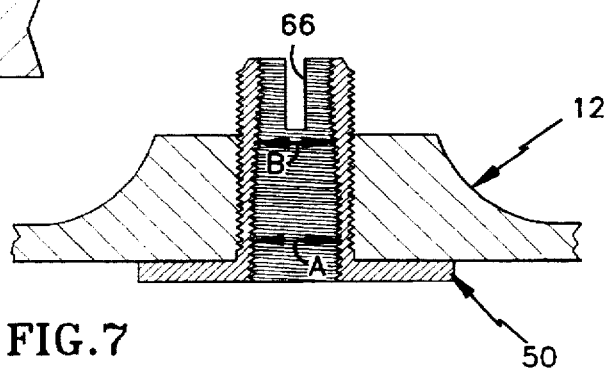
FIG. 7 shows the insert received within the outer wall.

Referring to FIGS. 4-8, the insert 50 is initially provided having an untapped uniform diameter center bore 62, the slot 66, and threads disposed in the outer surface 64. The insert 50 is subsequently received within a tooling fixture 68 (see FIG. 5), the latter having a threaded aperture 70 with a taper 72 disposed in one end. A tapered thread tap 74 is run through the center bore 62 of the insert 50, cutting threads throughout the bore 62. As the tap 74 proceeds through the bore 62, the slot 66 disposed in the end of the insert 50 allows the insert body 58 to elastically deflect laterally into the fixture aperture taper 72. As a result, the center bore thread diameter "A" (see FIGS. 7 and 8) is greater in the body segment closest to the flange 56 in comparison with the bore thread diameter "B" (see FIGS. 7 and 8) in the body segment adjacent the slot 66. FIG. 7, which shows a cross-section of the insert 50 received within the outer wall 12, illustrates the difference in thread diameter ("A" vs. "B") in an exaggerated manner for sake of clarity.

Referring to FIGS. 2, 3, and 8, during installation of the inner wall sections 20, a fastener 42 is received within the aperture or slot 40 within each standoff 16. In the embodiment using male 26 and female 28 circumferential joint halves, the inner wall section 20 is circumferentially rotated until one of the male 26 or female 28 halves is fully engaged with the mating section of the adjacent inner wall section 20. The inner wall section 20 is then rotated a distance in the opposite direction to allow the opposite circumferential edge 24 to engage the mating half of the other adjacent inner wall section 20.

In both inner wall section embodiments, the first 18 and second 22 apertures within the walls 12,14 are aligned and the fasteners 42 are engaged with the inserts 50 using a tool 51 extending through the second apertures 22 in the inner wall sections 20. The section of the insert center bore 62 having a smaller thread diameter ("B") creates an interference fit between the fastener 42 and the insert 50, thereby "locking" the fastener 42 within the insert 50. In this context, the term "locking" refers to the fact that the force necessary to overcome the interference fit between the fastener 42 and the insert 50 is sufficient to prevent the fastener 42 from vibrating free. The portion of the insert 50 extending outside of the outer wall 12 includes the slot 66. The slot 66 enables the insert 50 to expand with the receipt of the fastener 42 to a dimension ("C") greater than the diameter ("D") of the first aperture 18 within the outer wall 12. The expanded portion of the insert 50 "locks" the insert 50 within the outer wall 12 so long as the fastener 42 is received therein. In the embodiment using the tapered ribs 30 (FIG. 3), the tapered ribs 30 are attached after the inner wall sections 20 are attached. In either embodiment, if a tab 46 is included in the standoff sidewalls 36, the tab 46 is bent to extend over the head 52 of the fastener 42 as a further precaution against the fastener 42 unintentionally dislodging.

When at a later time it becomes necessary to replace an inner wall section 20, the fasteners 42 are freed from the inserts 50 using the same tool 51 and procedure as described heretofore. In the first embodiment (FIG. 2), the inner wall section 20 is rotated in one direction until one mating joint 26,28 disconnects, and then rotated in the other direction until the section 20 is free completely. In the second embodiment (FIG. 3), the tapered ribs 30 are removed prior to removing the inner wall sections 20. After the inner wall sections 20 are removed, the inserts 50 can be removed from outer wall, if desired, without accessing the outside of the outer wall. Hence, there is no need to remove the engine or engine section during liner servicing.

Referring to FIGS. 2 and 3, during operation of the engine the duct 76 formed between the inner 14 and outer 12 walls is filled with bled air at a pressure higher than that of the core gas passing by the inner wall 14. The pressurized bled air forces the inner wall 14 radially inward, away from the outer wall 12. The present invention utilizes that inward force in several advantageous ways. First, the inward force biases the inner wall 14 and attached standoffs 16 inwardly, and thereby further biases the fasteners 42 within the inserts 50. The additional bias helps "lock" the fasteners 42 and the inserts 50 together. Second, the inward force pushes the inner wall segments 20 together and thereby increases the hoop strength of the inner wall 14. The hoop strength of the first embodiment (FIG. 2) increases when the male 26 and female joint 28 halves further engage under pressure. The hoop strength of the second embodiment (FIG. 3) increases when the inner wall sections 20 are forced up the taper of the ribs 30. The increased hoop strength helps the inner wall resist buckling, while adding only minimal additional weight to the liner.

Although this invention has been shown and described with respect to the detailed embodiments thereof, it will be understood by those skilled in the art that various changes in form and detail thereof may be made without departing from the spirit and the scope of the invention. For example, this liner 10 has been discussed in terms of a augmentor liner, but may alternatively be used elsewhere in the engine. The attachment assemblies 15 described herein as a method of securing the inner wall sections 20 may also be used to attach the tapered ribs 30 of the second embodiment.

We claim:

1. A liner for a gas turbine engine, comprising:
   an outer wall;
   an inner wall, having a plurality of sections, each said section having a first edge and a second edge, wherein said first edge includes a male half of a mating joint and said second edge includes a female half of said mating joint;

a plurality of standoffs, attached to said inner wall sections; and a plurality of attachment assemblies, for fixing at least one of said standoffs to said outer wall, per inner wall section, said standoffs separating said inner and outer walls.

2. A liner for a gas turbine engine according to claim 1, wherein said outer wall further comprises a plurality of first apertures, and each said inner wall section further comprises a second aperture;

wherein said first apertures, second apertures, and attachment assemblies are aligned with one another.

3. A liner for a gas turbine engine according to claim 2, wherein one of said standoffs is positioned adjacent each said first aperture.

4. A liner for a gas turbine engine according to claim 3, wherein said inner and outer walls are substantially concentric, said inner wall disposed radially inside of said outer wall, and said first and second edges are disposed circumferentially.

5. A liner for a gas turbine engine according to claim 4, wherein said first edge of each said section comprises a first flange, and said second edge of each said section comprises a channel for receiving said first flange, wherein engagement of said first flange in said channel changes to accommodate changes in pressure across said inner wall.

6. A liner for a gas turbine engine according to claim 5, wherein each said attachment assembly further comprises:

a fastener; and an insert, having a second flange and a body, said insert body including a center bore and an outer surface;

wherein each said insert body is received within one of said first apertures, and each said fastener is received within said insert.

7. A liner for a gas turbine engine according to claim 6, wherein said insert further comprises a slot disposed within an end of said body opposite said second flange.

8. A liner for a gas turbine engine according to claim 7, wherein said center bore of said insert body and said fastener are threaded.

9. A liner for a gas turbine engine according to claim 8, wherein said threaded center bore of said insert body includes a portion having a thread diameter less than that of said fastener, thereby creating an interference fit between said center bore and said fastener.

10. A liner for a gas turbine engine according to claim 9, wherein said end of said insert body, opposite said second flange, has a diameter greater than that of said first aperture when said fastener is substantially received within said insert center bore, thereby preventing said insert from dislodging from said outer wall.

11. A liner for a gas turbine engine according to claim 10, wherein said standoff comprises:

a base, having a third aperture for receiving said fastener;

a side wall, extending between said base and said inner wall section; and a tab, extending out from said side wall, in the direction of said third aperture, wherein said tab may be deflected into alignment with said fastener to prevent said fastener from dislodging from said insert.

12. A liner for a gas turbine engine according to claim 1, wherein each said attachment assembly further comprises:

a fastener; and an insert, having a flange and a body, said insert body including a center bore and an outer surface;

wherein said outer wall includes a plurality of apertures; and wherein each said insert body is received within one of said apertures, and each said fastener is received within said insert.

13. A liner for a gas turbine engine according to claim 12, wherein said insert further comprises a slot disposed within an end of said body opposite said flange.

14. A liner for a gas turbine engine according to claim 13, wherein said center bore of said insert body and said fastener are threaded.

15. A liner for a gas turbine engine according to claim 14, wherein said threaded center bore of said insert body includes a portion having a thread diameter less than that of said fastener, thereby creating an interference fit between said center bore and said fastener.

16. A liner for a gas turbine engine according to claim 15, wherein said end of said insert body, opposite said flange, has a diameter greater than that of said aperture when said fastener is substantially received within said insert center bore, thereby preventing said insert from dislodging from said outer wall.

17. A liner for a gas turbine engine according to claim 16, wherein said standoff comprises:

a base;

a side wall, extending between said base and said inner wall section; and a tab, extending out from said side wall, wherein said tab may be deflected into alignment with said fastener to prevent said fastener from dislodging from said insert.

* * * * *